US010255290B2

(12) United States Patent
Harnik et al.

(10) Patent No.: US 10,255,290 B2
(45) Date of Patent: *Apr. 9, 2019

(54) IDENTIFICATION OF HIGH DEDUPLICATION DATA

(71) Applicant: International Business Machines Corporation, Armonk, NY (US)

(72) Inventors: Danny Harnik, Tel Mond (IL); Ety Khaitzin, Holon (IL); Sergey Marenkov, Tel Aviv (IL); Dmitry Sotnikov, Rishon-Lezion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,702

(22) Filed: Apr. 17, 2018

(65) Prior Publication Data

US 2018/0225300 A1    Aug. 9, 2018

Related U.S. Application Data

(63) Continuation of application No. 15/678,449, filed on Aug. 16, 2017, now Pat. No. 9,984,092, which is a
(Continued)

(51) Int. Cl.
*G06F 7/00* (2006.01)
*G06F 17/30* (2006.01)
*G06F 17/00* (2006.01)

(52) U.S. Cl.
CPC .. *G06F 17/30159* (2013.01); *G06F 17/30156* (2013.01)

(58) Field of Classification Search
CPC .............. G06F 17/30156; G06F 17/30159
See application file for complete search history.

(56) References Cited

U.S. PATENT DOCUMENTS 8,280,854 B1    10/2012    Emmert
8,615,499 B2    12/2013    Chambliss et al.
(Continued)

FOREIGN PATENT DOCUMENTS

WO    2007127360 A2    11/2007

OTHER PUBLICATIONS

Alon et al., "The Space Complexity of Approximating the Frequency Moments*", (* A preliminary version of this paper appeared in Proceedings of the 28th Annual ACM Symposium on Theory of Computing (STOC), May 1996), Journal of Computer and System Sciences 58, 137-147 (1999), Copyright © 1999 by Academic Press.
(Continued)

*Primary Examiner* — Kannan Shanmugasundaram
(74) *Attorney, Agent, or Firm* — Aaron N. Pontikos (57) ABSTRACT

A computer-implemented method includes dividing a data set into a plurality of regions and dividing the plurality of regions into a plurality of chunks of fixed size. The computer-implemented method further includes determining a sample size of the plurality of chunks to be sampled for each region, wherein the sample size is determined based, at least in part, on an acceptance of a likelihood of identifying at least one collision between two regions corresponding to logical entities of a first cluster of logical entities. The computer-implemented method further includes sampling the plurality of chunks for each region based on the determined sample size. The computer-implemented method further includes generating a hash value for each chunk sampled and storing each hash value in an index. The computer-implemented method further includes identifying one or more collisions between the plurality of regions. A corresponding computer system and computer program product are also disclosed.

1 Claim, 3 Drawing Sheets

Related U.S. Application Data continuation of application No. 15/364,727, filed on Nov. 30, 2016.

(56) References Cited

U.S. PATENT DOCUMENTS

| | | | |
|---|---|---|---|
| 8,650,163 | B1 | 2/2014 | Harnik et al. |
| 8,793,226 | B1 | 7/2014 | Yadav et al. |
| 8,825,969 | B2 | 9/2014 | Gupta et al. |
| 8,891,473 | B2 | 11/2014 | Akirav et al. |
| 8,898,120 | B1 | 11/2014 | Efstathopoulos |
| 9,152,333 | B1 | 10/2015 | Johnston et al. |
| 9,465,808 | B1 | 10/2016 | Karr et al. |
| 9,984,092 | B1 | 5/2018 | Harnik et al. |
| 2014/0052699 | A1 | 2/2014 | Harnik et al. |
| 2014/0201170 | A1 | 7/2014 | Vijayan et al. |
| 2014/0244604 | A1 | 8/2014 | Oltean et al. |
| 2014/0304239 | A1 | 10/2014 | Lewis et al. |
| 2016/0034201 | A1 | 2/2016 | Chambliss et al. |
| 2016/0350324 | A1 | 12/2016 | Wang et al. |
| 2018/0150473 | A1 | 5/2018 | Harnik et al. |

OTHER PUBLICATIONS

Charikar et al., "Towards Estimation Error Guarantees for Distinct Values", POD 2000, Dallas, TX, USA, pp. 268-279, © ACM 2000.

Constantinescu et al., "Quick Estimation of Data Compression and De-Duplication for Large Storage Systems", 2011 First International Conference on Data Compression, Communications and Processing, pp. 98-102, DOI 10.1109/CCP.2011.41, © 2011 IEEE.

Gibbons, Phillip B., "Distinct-Values Estimation over Data Streams", Intel Research Pittsburgh, Pittsburgh PA 15213, USA, Jan. 2007, pp. I-XXVII, retrieved on Jul. 15, 2016, <http://www.cs.cmu.edu/~gibbons>.

Harnik et al., "Estimating Unseen Deduplication—from Theory to Practice", 14th USENIX Conference on File and Storage Technologies (FAST '16), Feb. 22-25, 2016, Santa Clara, CA, USA, USENIX Association, 14 pages.

Harnik et al., "Estimation of Deduplication Ratios in Large Data Sets", IBM Research, Haifa, Israel, 11 pages, 978-1-4673-1747-4/11, © IEEE 2012.

Harnik et al., "Gauging Accuracy of Sampling-Based Distinct Element Estimation", U.S. Appl. No. 14/994,160, filed Jan. 13, 2016, 31 pages.

Harnik et al., "Sampling-Based Deduplication Estimation", U.S. Appl. No. 14/994,161, filed Jan. 13, 2016, 34 pages.

Harnik et al., "Low Memory Sampling-Based Estimation of Distinct Elements and Deduplication", U.S. Appl. No. 14/994,163, filed Jan. 13, 2016, 34 pages.

Harnik et al., "To Zip or not to Zip: Effective Resource Usage for Real-Time Compression", IBM Research—Haifa, 11th USENIX Conference on File and Storage Technologies (FAST '13), USENIX Association, pp. 229-241.

Raskhodnikova et al., "Strong Lower Bounds for Approximating Distribution Support Size and the Distinct Elements Problem", Siam J. Comput., vol. 39, No. 3, pp. 813-842, © 2009 Society for Industrial and Applied Mathematics. (Accepted for publication (in revised form) May 15, 2009; published electronically Aug. 6, 2009).

Valiant et al., "Estimating the Unseen: An n/log(n)-sample Estimator for Entropy and Support Size, Shown Optimal via New CLT", STOC'11, Jun. 6-8, 2011, San Jose, California, USA, Copyright 2011 ACM 978-1-4503-0691-1/11/06, pp. 685-694.

Wei et al., "MAD2: A Scalable High-Throughput Exact Deduplication Approach for Network Backup Services", May 7, 2010, pp. 1-25.

Xie et al., "Estimating Duplication by Content-based Sampliing", 2013 USENIX Annual Technical Conference (USENIX ATC '13), USENIX Association, pp. 181-186.

Xing et al., "PeerDedupe: Insights into the Peer-assisted Sampling Deduplication", 2010 IEEE Tenth International Conference on Peer-to-Peer Computing (P2P), DOI: 10.1109/P2P.2010.5570004, © 2010 IEEE, 10 pages.

"Efficient Deduplicated Data Extent Discovery", An IP.com Prior Art Database Technical Disclosure, Authors et. al.: Disclosed Anonymously, IP.com No. IPCOM000212843D, IP.com Electronic Publication Date: Nov. 30, 2011, 3 pages.

Harnik et al., "Identification of High Deduplication Data", U.S. Appl. No. 15/364,727, filed Nov. 30, 2016, 33 pages.

Harnik et al., "Identification of High Deduplication Data", U.S. Appl. No. 15/678,449, filed Aug. 16, 2017, 25 pages.

Harnik et al., "Identification of High Deduplication Data", U.S. Appl. No. 15/954,739, filed Apr. 17, 2018, 26 pages.

IBM Appendix P, "List of IBM Patents or Patent Applications to be Treated as Related", Dated Apr. 17, 2018, 2 pages.

IDENTIFICATION OF HIGH DEDUPLICATION DATA

BACKGROUND

The present invention relates generally to data deduplication and in particular to distinguishing deduplicatable parts of a dataset from non-deduplicatable parts of the dataset.

Data deduplication is a data compression technology that reduces bandwidth and storage space by eliminating duplicate copies of repeating data. In the deduplication process, data is analyzed, whereby unique chunks of data (i.e., "byte patterns") are identified and stored. As the data is further analyzed, additional chunks of data are compared to previously identified and stored chunks of data. Whenever a match occurs between two chunks of data, the redundant chunk of data is replaced with a reference that points to the stored chunk of data. In other words, only one instance of the chunk of data is actually stored. Any subsequent instances of duplicate chunks of data are referenced back to the stored copy. Whereas the same byte pattern may occur thousands of times, data deduplication reduces the amount of data required to be transferred or stored.

SUMMARY

A computer-implemented method includes dividing a data set into a plurality of regions. The dataset includes a plurality of logical entities. Each logical entity of the plurality of logical entities includes one or more regions of the plurality of regions. The computer-implemented method further includes dividing the plurality of regions into a plurality of chunks of fixed size. The computer-implemented method further includes determining a sample size of the plurality of chunks to be sampled for each region of the plurality of regions, wherein the sample size is determined based, at least in part, on an acceptance of a likelihood of identifying at least one collision between a first region corresponding to a first logical entity of the plurality of logical entities and a second region corresponding to a second logical entity of the plurality of logical entities of a first cluster of logical entities. The computer-implemented method further includes sampling the plurality of chunks for each region based on the determined sample size. The computer-implemented method further includes generating a hash value for each chunk of the plurality of chunks sampled. The computer-implemented method further includes storing each hash value in an index. The computer-implemented method further includes identifying a plurality of collisions between the plurality of regions. The computer-implemented method further includes determining that a region of the plurality of regions of the dataset includes deduplicatable data. A corresponding computer system and computer program product are also disclosed.

DETAILED DESCRIPTION

Data deduplication is beneficial to data storage systems, networks, and virtual servers. Regarding data storage systems, data deduplication may reduce the amount of storage needed for a given set of files. It is most effective in applications where many copies of very similar or even identical data are stored on a single disk. For example, in the case of data backups (which are routinely performed to protect against data loss), much of the data in a given backup remains unchanged from a previous backup. Here, data deduplication may reduce storage capacities by ratios upwards of 1:50. Regarding networks, data deduplication may reduce the number of bytes transferred between endpoints, which ultimately reduces the amount of bandwidth required. Regarding virtual servers, data deduplication allows for nominally separate system files for each virtual sever to be coalesced into a single storage space. However, if a given server customizes a file, deduplication will not change the files on the other servers. Additionally, there is a high level of repetition of operating system data displayed between different virtual machines. This is especially evident in Virtual Desktop Infrastructure (VDI) environments. Here, data duplication may reduce storage capacities by ratios upwards of 1:30.

Embodiments of the present invention recognize that performing deduplication consumes a lot of system resources (e.g., CPU usage, memory, disk input/output ("I/O") operations). Embodiments of the present invention recognize that it is disadvantageous to allocate system resources to perform deduplication on data that has a low data deduplication potential. Allocating system resources to data that has a low data duplication potential interferes with the effectiveness of deduplication of other volumes of data that have a high data duplication potential. This is further evinced with in-line deduplication (i.e., "real-time deduplication"). In-line deduplication requires deduplication hash calculations and index lookups, resulting in input/output ("I/O") processing latency and performance degradation. Embodiments of the present invention recognize that current deduplication estimation techniques only give an overall estimation of data deduplication potential. Furthermore, current deduplication estimation techniques require either a full scan of the data using low memory techniques or sampling of a high percentage (e.g., 10 percent) of the data. Consequently, with today's multi petabyte scale systems, a large amount of time and computer resources are required to sample only 10 percent of the data.

Embodiments of the present invention recognize that it is desirable to efficiently distinguish deduplicatable parts of data from non-deduplicatable parts of data generated by backup systems and virtual environments. In some embodiments, the present invention is directed toward data migration from a first storage system containing data that has not undergone deduplication to a second storage system that supports deduplication. Embodiments of the present invention recognize that with data migration, only a small portion of the data from the first storage system that contains data that has not undergone deduplication will benefit from deduplication. In some embodiments, the present invention is directed toward a storage system having two different tiers (e.g., a first tier for storing data without deduplication and a second tier for storing data with deduplication). Embodiments of the present invention recognize that it would be advantageous for a system administrator to be able to decide how to distribute the data in a storage system having multiple tiers. In some embodiments, the present invention is directed toward capacity planning with deduplication. Capacity planning requires an accurate deduplication estimation that involves a lot of time and computer resources. Embodiments of the present invention allow for the pre-processing of data to identify data with high duplication potential, thereby reserving a more in-depth estimation process for only those parts of the data with high duplication potential. Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
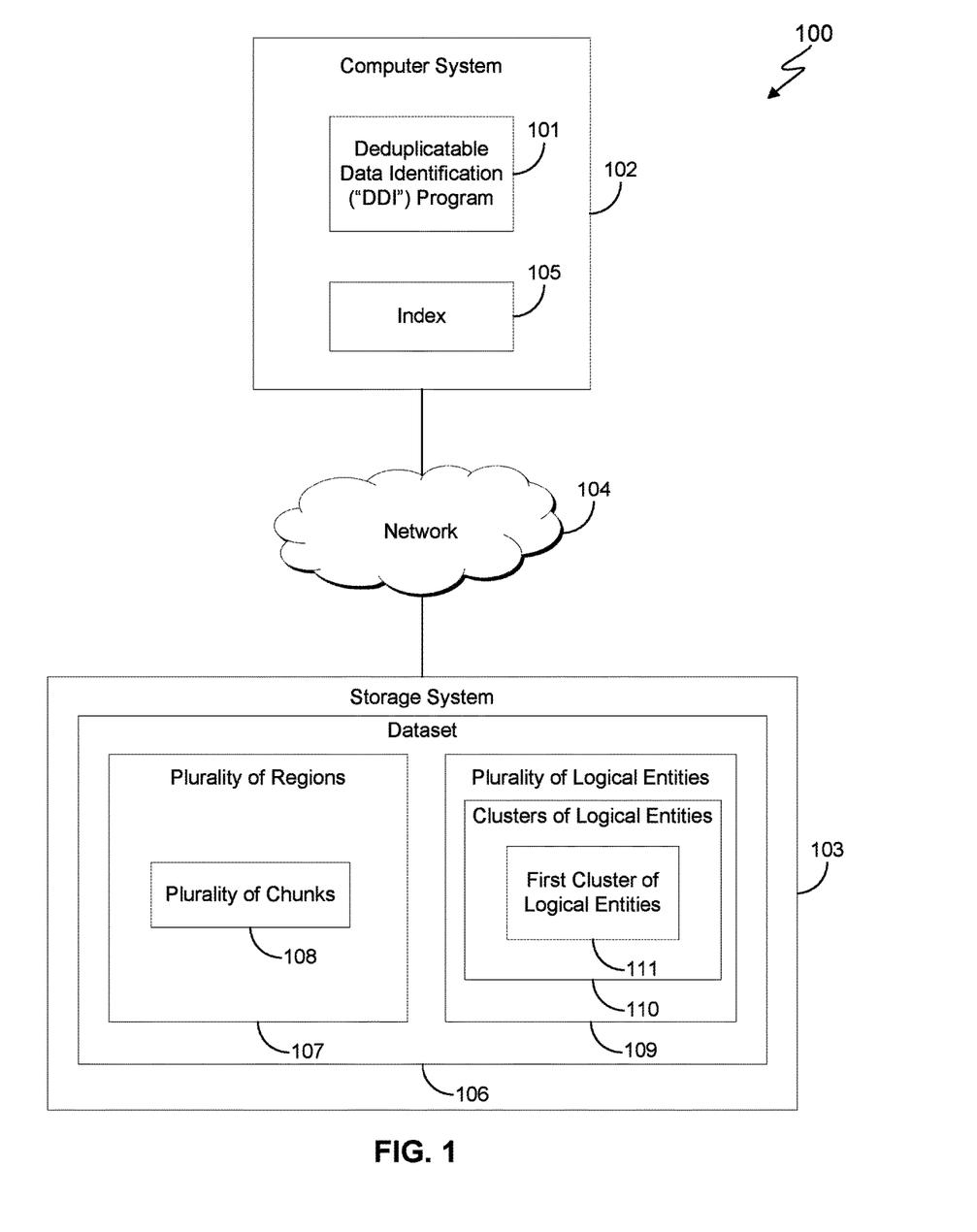
FIG. 1 is a functional block diagram of a computing environment, generally designated 100, suitable for operation of a deduplicatable data identification program, in accordance with at least one embodiment of the invention.

Referring now to various embodiments of the invention in more detail, FIG. 1 is a functional block diagram of a computing environment, generally designated 100, suitable for operation of a deduplicatable data identification ("DDI") program in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer system 102 and storage system 103 interconnected over network 104. Network 104 can be, for example, a telecommunications network, a local area network (LAN), a wide area network (WAN), such as the Internet, or a combination of the three, and can include wired, wireless, or fiber optic connections. Network 104 may include one or more wired and/or wireless networks that are capable of receiving and transmitting data, voice, and/or video signals, including multimedia signals that include voice, data, and video information. In general, network 104 may be any combination of connections and protocols that will support communications between computer system 102, storage system 103, and other computing devices (not shown) within computing environment 100.

Computer system 102 can be a standalone computing device, a management server, a web server, a mobile computing device, or any other electronic device or computing system capable of receiving, sending, and processing data. In other embodiments, computer system 102 can represent a server computing system utilizing multiple computers as a server system, such as in a cloud computing environment. In an embodiment, computer system 102 represents a computing system utilizing clustered computers and components (e.g., database server computers, application server computers, etc.) that act as a single pool of seamless resources when accessed within computing environment 100. Computer system 102 includes DDI program 101 and index 105 communicatively coupled to computer system 102. In embodiments of the invention, index 105 is a global index. In embodiments of the invention, index 105 is a local index. Although index 105 is depicted in FIG. 1 as being integrated with computer system 102, in some embodiments, index 105 may be remotely located from computer system 102. Computer system 102 may include internal and external hardware components, as depicted and described in further detail with respect to FIG. 3.

Storage system 103 includes dataset 106. In embodiments of the invention, storage system 103 can be a standalone computing device, a management server, a web server, or any other electronic device capable of receiving, sending, and processing data. In embodiments of the invention, dataset 106 is divided into a plurality of regions 107 and each region of the plurality of regions 107 is further divided into a plurality of chunks 108.

In embodiments of the invention, dataset 106 includes a plurality of logical entities 109. Each logical entity of plurality of logical entities 109 includes one or more regions of plurality of regions 107. In some embodiments, dataset 106 includes one or more clusters of logical entities 110. Each logical entity inside a cluster shares a large portion of data with all other logical entities in the same cluster. For simple illustrative purposes, embodiments of the invention include a first cluster of logical entities 111. Here, first cluster of logical entities 111 may generally be understood as a group of logical entities that form the same cluster. However, it should be understood that embodiments of the invention may include a single cluster of logical entities, many clusters of logical entities, or no clusters of logical entities at all. In embodiments of the invention, the likelihood of DDI program 101 identifying deduplicatable data increases as the cluster size increases. However, even if no clusters of logical entities are present in dataset 106, DDI program 101 may still identify deduplicatable data.

Figure 2:
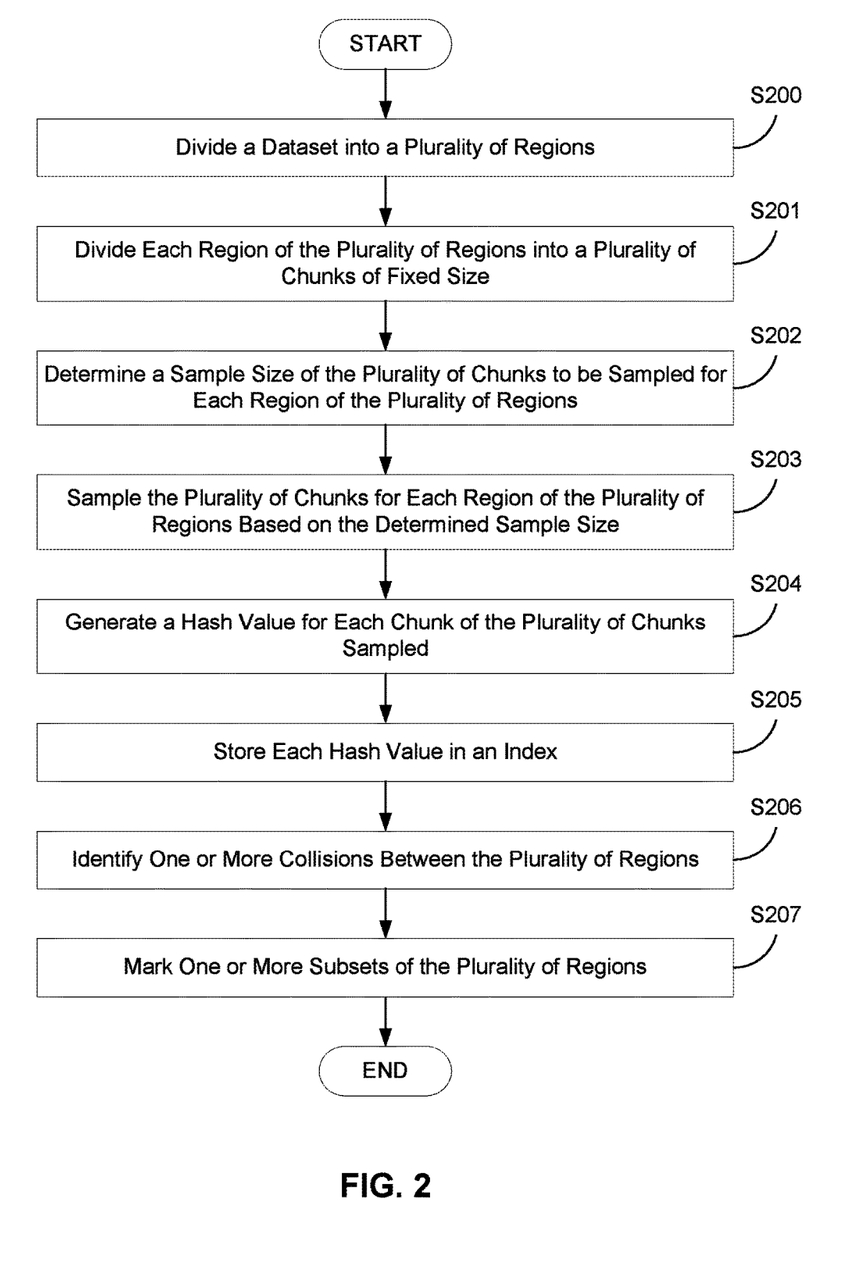
FIG. 2 is a flow chart diagram depicting operational steps for a deduplicatable data identification program, in accordance with at least one embodiment of the invention.

FIG. 2 is a flow chart diagram depicting operational steps for a DDI program in accordance with at least one embodiment of the invention. In embodiments of the invention, DDI program 101 identifies and separates a relatively small portion of dataset 106 that is highly deduplicatable (e.g., system backups and/or virtual environments) from a relatively large portion of dataset 106 that is not deduplicatable (e.g., databases). Embodiments of the present invention recognize that among dataset 106 stored in storage system 103 (e.g., storage area network ("SAN") and/or network attached storage ("NAS")), highly deduplicatable data usually form one or more clusters of logical entities with great similarity between the logical entities that form each cluster. In some embodiments, a logical entity is a system backup and a cluster of logical entities is the group of backups generated by the same system. In some embodiments, a logical entity is a virtual machine disk ("VMDK") file and a cluster of logical entities is the group of VMDK files generated by the same virtual machine.

At step S200, DDI program 101 divides dataset 106 stored in storage system 103 into a plurality of regions 107. In some embodiments, each region of plurality of regions 107 is of fixed size. In embodiments of the invention, dataset 106 includes plurality of logical entities 109. In some embodiments, plurality of logical entities 109 are structured as data blocks. In some embodiments, plurality of logical entities 109 are structured as data files. In some embodiments, plurality of logical entities 109 are structured as data folders. In some embodiments, plurality of logical entities 109 are structured as data objects.

In some embodiments, the size of each region of plurality of regions 107 is determined based on a size of dataset 106. For example, if dataset 106 is 10 terabytes ("TB") in size, then dataset 106 may be divided into five-thousand 2 gigabyte ("GB") regions. In some embodiments, the size of each region of plurality of regions 107 is determined based on additional knowledge about dataset 106, such as the identity (i.e., internet protocol ("IP") address) of each system that contributed data to dataset 106 stored in storage system 103, the number of logical entities (e.g., system backups or virtual machine disk ("VMDK") files) in dataset 106 corresponding to each system, and the typical size of each logical entity. For example, if dataset 106 is 10 TB in size and a typical system backup is 10 GB in size, then DDI program 101 may divide dataset 106 into ten-thousand 1 GB regions since each logical entity of plurality of logical entities 109 should be divided into several regions.

At step S201, DDI program 101 further divides each region of plurality of regions 107 into a plurality of chunks 108 of fixed size. A chunk may generally be understood as a fraction of the data contained in each region of plurality of regions 107. In some embodiments, the chunk size is of variable size. For example, if each region of plurality of regions 107 is 1 GB in size, then DDI program 101 may divide each 1 GB region into two-hundred-fifty-six 8 kilobyte ("KB") chunks. In some embodiments, the chunk size is determined based on the system requirements (e.g., the chinking method) of data duplication software. For example, if data deduplication software requires byte strings of four KB in size, then for each 1 GB region of plurality of regions 107, DDI program 101 may divide each 1 GB region into five-hundred-twelve 4 KB chunks.

At step S202, DDI program 101 determines a sample size of the plurality of chunks 108 to be sampled for each region of plurality of regions 107. In embodiments of the invention, the sample size is determined based, at least in part, on an acceptance of a likelihood of identifying at least one collision between a first region corresponding to a first logical entity of plurality of regions 107 and a second region corresponding to a second logical entity of plurality of regions 107 of first cluster of logical entities 111 of dataset 106. A collision denotes that two or more regions of plurality of regions 107 share an identical hash value (i.e., "byte string"). In some embodiments, the sample size is determined based on an acceptance of the same likelihood of identifying a collision between two regions for each individual cluster of two or more clusters of logical entities in dataset 106.

In embodiments of the invention, the likelihood of identifying at least one collision between the first region corresponding to the first logical entity and the second region corresponding to the second logical entity of first cluster of logical entities 111 is based on identifying a cluster size for first cluster of logical entities 111. In some embodiments, a cluster size is identified for each cluster of logical entities in dataset 106. In some embodiments, a cluster size is unknown, and a cluster size is selected based on a desired cluster size to be identified (e.g., cluster size of 10). In some embodiments, a cluster size for one or more clusters of logical entities is determined based on identifying additional knowledge about dataset 106, including, but not limited to which systems contributed backup files or VMDK files to dataset 106, the frequency (i.e., time period) in which the systems typically generate a backup file or VMDK file (e.g., weekly, bi-weekly, monthly) and the time period over which dataset 106 was generated (e.g., one month, six months, one year).

For example, a user of DDI program 101 identifies that a portion of dataset 106 includes data generated by systems A, B, and C. Based on the frequency in which each system generates a backup file (i.e., a logical entity), the user may determine a number of logical entities generated by each system during the time period during which dataset 106 was formed (e.g., one year). If system A generates a backup every two weeks, the user may determine that dataset 106 includes a cluster size of 26 for system A. Similarly, if system B generates a backup every month, the user may determine that dataset 106 includes a cluster size of 12 for system B. Similarly, if system C generates a backup every two months, the user may determine that dataset 106 includes a cluster size of 6 for system C. In some embodiments, DDI program selects the smallest cluster size in order to determine the necessary sample size. In some embodiments, the DDI program 101 selects the largest cluster size in order to determine the necessary sample size. In some embodiments, DDI program 101 selects a cluster size in between the smallest cluster size and the largest cluster size in order to determine the necessary sample size.

In embodiments of the invention, the likelihood of identifying at least one collision between the first region corresponding to the first logical entity and the second region corresponding to the second logical entity of first cluster of logical entities 111 is based on determining a degree of similarity between the logical entities of first cluster of logical entities 111 in dataset 106. In some embodiments, a degree of similarity is determined between the logical entities of each cluster of logical entities in dataset 106.

In some embodiments, a degree of similarity between logical entities that form each cluster of logical entities is unknown and a degree of similarity is selected based on a desired degree of similarity (e.g., 50 percent similarity) that will result in a high likelihood that DDI program 101 will identify at least one collision. In some embodiments, a degree of similarity between the logical entities that form each cluster of logical entities is determined based on identifying additional knowledge about dataset 106, including, but not limited which systems contributed backup files or VMDK files to the dataset 106, the frequency (i.e., time period) in which the systems typically generate a backup file or VMDK file (e.g., weekly, bi-weekly, monthly), and the time period during which dataset 106 was generated (e.g., one month, six months, one year. In some embodiments, DDI program 101 selects the smallest degree of similarity in order to determine the desired sample size. In some embodiments, the DDI program 101 selects the largest degree of similarity in order to determine the desired sample size. In some embodiments, DDI program 101 selects a degree of similarity in between the smallest degree of similarity and the largest degree of similarity in order to determine the desired sample size.

In some embodiments, the likelihood of identifying at least one collision between the first region corresponding to the first logical entity and the second region corresponding to the second logical entity of first cluster of logical entities 111 is determined based on the following equation:

$$1 - \left[(1 - \text{similarity}) + \text{similarity} * \left(1 - \frac{|\text{sample}| * (|\text{cluster}| - 1)}{\text{region}}\right)^{|\text{sample}|}\right]^{|\text{sample}|} = \text{likelihood}$$

where similarity is the degree of similarity between the logical entities that form first cluster of logical entities 111 (the degree of similarity should be converted into decimal format for purposes of this equation), |sample| is the sample size of plurality of chunks 108 to be selected in each region of plurality of regions 107 of dataset 106 (the sample size should be converted into decimal format for purposes of this equation), |cluster| is the cluster size of first cluster of logical entities 111, and region is the total number of chunks that form each region of plurality of regions 107 of dataset 106.

For example, DDI program 101 determines a likelihood of identifying at least one collision between one region corresponding to a first logical entity and another region corresponding to a second logical entity of first cluster of logical entities 111 based on the following information about a 10 TB dataset: (i) the dataset is divided into ten-thousand 1 GB regions; (ii) each region is divided into 131,072 8 KB chunks; (iii) first cluster of logical entities 111 has a cluster size of 12; (iv) first cluster of logical entities 111 has a 50 percent (0.5) similarity between the logical entities that form first cluster of logical entities 111; and (v) a sample size of 0.2 percent (0.002) of the total number of chunks in a region is selected (i.e., ~262 8 KB chunks). Based on the above listed information, a likelihood of identifying at least one collision when first cluster of logical entities 111 has a cluster size of 12 is as follows:

$$1 - \left[(1 - \text{similarity}) + \text{similarity} * \left(1 - \frac{|\text{sample}| * (|\text{cluster}| - 1)}{\text{region}}\right)\right]^{|\text{sample}|} = \text{likelihood}$$

$$1 - \left[(1 - 0.5) + 0.5 * \left(1 - \frac{|262| * (|12| - 1)}{131{,}072}\right)\right]^{|262|} =$$

0.94 (94 percent) likelihood

In another example, DDI program 101 determines a likelihood of identifying at least one collision between one region corresponding to a first logical entity and another region corresponding to a second logical entity of first cluster of logical entities 111 based on the following information about a 10 TB dataset: (i) the dataset is divided into ten-thousand 1 GB regions; (ii) each region is divided into 131,072 8 KB chunks; (iii) first cluster of logical entities 111 has a cluster size of 5; (iv) first cluster of logical entities 111 has a 50 percent (0.5) similarity between the logical entities that form first cluster of logical entities 111; and (v) a sample size of 0.2 percent (0.002) of the total number of chunks in a region is selected (i.e., ~262 8 KB chunks). Based on the above listed information, a likelihood of identifying at least one collision when first cluster of logical entities 111 has a cluster size of 5 is as follows:

$$1 - \left[(1 - \text{similarity}) + \text{similarity} * \left(1 - \frac{|\text{sample}| * (|\text{cluster}| - 1)}{\text{region}}\right)\right]^{|\text{sample}|} = \text{likelihood}$$

$$1 - \left[(1 - 0.5) + 0.5 * \left(1 - \frac{|262| * (|5| - 1)}{131{,}072}\right)\right]^{|262|} =$$

0.65 (65 percent) likelihood

As demonstrated by the previous examples, it should be appreciated that the likelihood of identifying a collision between logical entities in a single cluster of logical entities increases as the cluster size increases. On the other hand, the likelihood of identifying a collision between logical entities in a single cluster of logical entities decreases as the cluster size decreases. This is evinced by the fact that the only variable modified between the first example and the second example was the cluster size. Likewise, the likelihood of identifying a collision between logical entities in a single cluster of logical entities increases as the degree of similarity between the logical entities increases and decreases as the degree of similarity between the logical entities decreases.

In some embodiments of the invention, the sample size is determined based on an accepted likelihood (e.g., at least an 80 percent likelihood) of identifying at least one collision between two regions corresponding to a particular cluster of logical entities. For example, DDI program 101 determines a sample size based on an 80 percent likelihood of identifying at least one collision between region A and region B of the same cluster of logical entities. In some embodiments, the sample size is determined such that an accepted likelihood (e.g., at least 75 percent likelihood) of identifying at least one collision between two regions for each cluster of logical entities of dataset 106 is met. For example, DDI program 101 determines a sample size based on a 75 percent likelihood of identifying at least one collision between region A and region C corresponding to one cluster of logical entities and at least one collision between region B and region E corresponding to another cluster of logical entities. It should be appreciated that by determining a sample size that meets the same acceptance of a likelihood of identifying at least one collision between two regions for each cluster of logical entities of dataset 106, DDI program may identify multiple clusters of logical entities with a high level of probability while utilizing the smallest necessary sample size. In some embodiments, a sample size is unknown and a sample size is selected based on pre-computed numbers that establish a particular likelihood (e.g., 75 percent) of identifying at least one collision in regions that are part of a cluster of some minimal size (e.g., 10) and similarity (e.g., 50 percent) that a user of DDI program 101 desires to be able to identify.

At step S203, DDI program 101 samples each region of the plurality of regions 107 based on the determined sample size. In some embodiments, DDI program 101 samples chunks at random locations in each region of plurality of regions 107. In some embodiments, DDI program 101 samples chunks at fixed locations for each region of plurality of regions 107. In some embodiments, DDI program 101 samples a first portion of chunks at fixed locations for each region of plurality of regions 107 and a second portion of chunks at random locations for each region of plurality of regions 107. It should be appreciated that by sampling each region of plurality of regions 107 at random locations and fixed locations, DDI program 101 may locate collisions between a cluster of logical entities 109 that that have a low degree of similarity but are structurally similar.

At step S204, DDI program 101 generates a hash value for each chunk of plurality of chunks 108 sampled in each region of the plurality of regions 107. A hash value is a numeric value of a fixed length that uniquely identifies data. DDI program 101 generates a hash value by transforming a string of characters contained in each chunk into a shorter fixed-length value or key that represents the original string. In some embodiments, DDI program 101 generates a hash value for the string of characters contained in each 8 KB chunk sampled. In some embodiments, DDI program 101 generates a hash value for the string of characters contained in each 4 KB chunk sampled. In some embodiments, DDI program 101 generates a hash value for the string of characters contained in any size chunk sampled. Here, the size of the chunk sampled is dependent on the chinking method of the underlying deduplication mechanism.

At step S205, DDI program 101 stores each hash value in index 105. In some embodiments, DDI program 101 stores each hash value in a local index. In some embodiments, DDI program 101 stores each hash value in a global index. In some embodiments, DDI program 101 stores a first location of the region corresponding to the hash value in index 105. In some embodiments, DDI program 101 stores a second location within the region corresponding to the hash value in index 105. It should be appreciated that by storing the location of the region corresponding to each hash value, the regions that have high internal deduplication between them can be identified. This can be extremely useful if portions of dataset 106 are to be migrated into several storage systems having separate deduplication domains.

At step S206, DDI program 101 identifies one or more collisions between plurality of regions 107 of dataset 106. A collision denotes that two or more regions within plurality of regions 107 include an identical hash value (i.e., byte string). In some embodiments, DDI program 101 determines that a region of plurality of regions 107 of dataset 106 includes deduplicatable data. Here, if two regions include an identical hash value, the two regions are said to include deduplicatable data. For example, if region A and region C include the identical hash value "33578," then region A and region C include deduplicatable data. In some embodiments, a region is identified as including deduplicatable data if a number of collisions between the region and other regions exceeds a given threshold (e.g., four collisions). For example, DDI program 101 identifies four collisions (i.e., four sets of identical hash values) between region A and other regions of plurality of regions 107 of dataset 106. In some embodiments, a region is identified as including deduplicatable data if a number of collisions between the same region (e.g., region A) and other regions that are identified as deduplicatable is above a given threshold.

It should be appreciated that the threshold of the number of collisions may be set based on the desired separation proportion of dataset 106. For example, if a storage system with a data deduplication mechanism is limited in computing resources, the threshold number of collisions found in a region may be set in such a way that only a limited amount of data with the highest deduplication potential will be directed to this storage system. In embodiments of the invention, the threshold number of collisions is increased depending on the sample size selected. For example, if the sample size selected is too big, DDI program 101 may identify deduplicatable regions that have low deduplication potential. In order to avoid identifying regions with low deduplication potential as being deduplicatable, a user of DDI program 101 may increase the threshold value of the number of collisions needed to identify a region as deduplicatable. Accordingly, a high probability will be maintained that DDI program 101 will identify only those regions that are part of a logical entity of the same cluster of logical entities that have a high deduplication potential.

At step S207, DDI program 101 marks one or more subsets of plurality of regions 107. A subset of plurality of regions 107 may generally be understood as a group of regions that are part of one or more logical entities of the cluster of logical entities. In some embodiments, DDI program 101 marks a subset of regions based on identifying a series of regions, wherein each region in the series of regions has at least one collision with at least one other region. For example, DDI program 101 marks region A, region C and region E as a subset based on region A and region C sharing at least one collision and region C and region E sharing at least one collision. In some embodiments, DDI program 101 marks a subset of plurality of regions 107 based on identifying at least one collision between each region of a number of regions of the series of regions, wherein the number of regions exceeds a given threshold (e.g., at least 4 regions). For example, DDI program 101 identifies a collision (e.g., identical hash value of "357") between region A and region C, another collision (e.g., identical hash value of "478") between region C and region E, another collision (e.g., identical hash value of "589") between region E and region G, and another collision (e.g., identical hash value of "679") between region G and region A. Here, DDI program marks regions A, C, E, and G as a subset of plurality of regions 107. In some embodiments, DDI program 101 marks a subset of plurality of regions based on identifying a number of collisions between each region of a number of regions of the series of regions, wherein the number of collisions between each region exceeds a first given threshold (e.g., at least 3 collisions) and the number of regions exceeds a second given threshold (e.g., at least 5 regions). In embodiments of the invention, each region of subset of regions that shares a number of collisions that exceeds a given threshold is given a special marking. Accordingly, DDI program 101 may mark a plurality of subsets, wherein the regions corresponding to each subset may be given a different marking or designation.

In embodiments of the invention, DDI program 101 allows for the identification and marking of subsets of plurality of regions 107 of dataset 106 that have high internal deduplication between the regions of each subset. This can be extremely important if various portions of the data from dataset 106 need to be migrated into several different storage systems with separate deduplication domains. In this scenario, it is crucial to send similar logical entities from the same cluster of entities into the same storage system.

Some embodiments of the present invention may include one, or more, of the following features, characteristics, and/or advantages: (i) distinguish deduplicatable parts of the data from non-deduplicatable parts of the data by sampling only a small fraction (e.g., 0.1 percent to 2.0 percent) of the data; (ii) identify similarities between regions of data to determine what data should be migrated together from storage containing data without deduplication to storage containing data with deduplication; (iii) determine which data should be collocated to the same deduplication domain (i.e., data belonging to the same cluster of logical entities) and which data should be collocated to a non deduplication domain (i.e., data not belonging to a cluster of logical entities), since the amount of data deduplication for this data may likely be insignificant; (iv) determine how much storage is required for data based on combining methods of the present invention with additional known deduplication estimation algorithms; (v) improve the performance of a computer system by limiting the allocation of system resources to data with high data deduplication potential; (vi) eliminate the need for a full scan of data using low memory techniques to determine deduplication estimation; and (vii) eliminate the need for sampling a high percentage (e.g., 10 percent) of the data to determine deduplication estimation.

Figure 3:
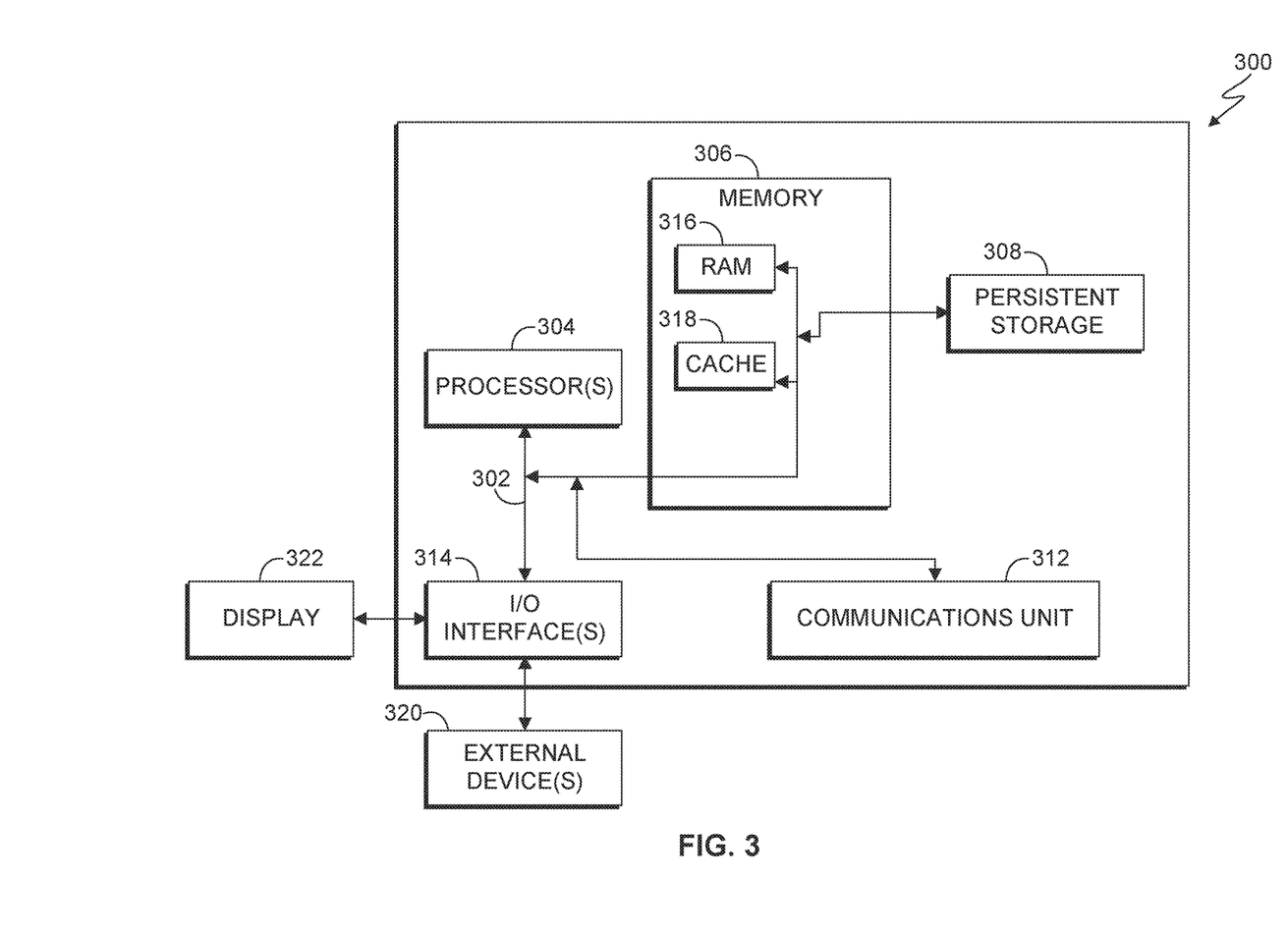
FIG. 3 is a block diagram of a computing apparatus 300 suitable for executing a deduplicatable data identification program, in accordance with at least one embodiment of the invention.

FIG. 3 is a block diagram depicting components of a computer 300 suitable for executing the DDI program 101. FIG. 3 displays the computer 300, the one or more processor(s) 304 (including one or more computer processors), the communications fabric 302, the memory 306, the RAM 316, the cache 318, the persistent storage 308, the communications unit 312, the I/O interfaces 314, the display 322, and the external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) and a cache 318. In general, the memory 306 may comprise any suitable volatile or non-volatile one or more computer readable storage media.

Program instructions for the DDI program 101 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for identifying portions of a dataset with high deduplication potential, the computer program product comprising one or more computer readable storage media and program instructions stored on said one or more computer readable storage media, said program instructions comprising instructions to:

divide a dataset into a plurality of regions, wherein:
  the dataset includes a plurality of logical entities; and
  each logical entity of the plurality of logical entities includes one or more regions of the plurality of regions;
divide the plurality of regions into a plurality of chunks of fixed size;
determine a sample size of the plurality of chunks to be sampled for each region of the plurality of regions, wherein the sample size is determined based, at least in part, on:
  an acceptance of a likelihood of identifying at least one collision between a first region corresponding to a first logical entity of the plurality of logical entities and a second region corresponding to a second logical entity of the plurality of logical entities of a first cluster of logical entities, wherein:
    the first cluster of logical entities includes at least the first logical entity and the second logical entity; and
    the likelihood of identifying at least the one collision between the first region corresponding to the first logical entity and the second region corresponding to the second logical entity of the first cluster of logical entities is based, at least in part, on instructions to:
      identify a cluster size for the first cluster of logical entities; and
      determine a degree of similarity between the first logical entity and the second logical entity of the first cluster of logical entities;
sample the plurality of chunks for each region based on the determined sample size;
generate a hash value for each chunk of the plurality of chunks sampled;
store each hash value in an index, wherein storing each hash value comprises instructions to:
  store a first location of the region corresponding to the hash value in the index; and
  store a second location within the region corresponding to the hash value in the index;
identify a plurality of collisions between the plurality of regions, wherein each collision of the plurality of collisions denotes that two or more regions of the plurality of regions share an identical hash value;
determine that a region of the plurality of regions of the dataset includes deduplicatable data, wherein the region of the plurality of the dataset includes deduplicatable data if the region shares an identical hash value with another region of the plurality of regions;
mark a first subset of the plurality of regions based on identifying a series of regions, wherein each region in the series of regions has at least one collision with at least one other region;
mark a second subset of the plurality of regions based on identifying at least one collision between each region of a number of regions of the series of regions, wherein the number of regions exceeds a given threshold;
mark a third subset of the plurality of regions based on identifying a number of collisions between each region of a number of regions of the series of regions, wherein:
  the number of collisions exceeds a first given threshold; and
  the number of regions exceeds a second given threshold;

separate at least one of the first subset, the second subset, and the third subset of the plurality of regions from the dataset based, at least in part, on available computing resources of a first storage system that supports data deduplication;
migrate at least one of the first subset, the second subset, and the third subset of the plurality of regions separated from the dataset to the first storage system; and
migrate those regions in the plurality of regions that are unmarked to a second storage system that does not support data deduplication.

* * * * *